(12) United States Patent
Liao

(10) Patent No.: US 7,516,972 B1
(45) Date of Patent: Apr. 14, 2009

(54) BICYCLE REAR FRAME HAVING EXACTLY LOCKING EFFECT

(76) Inventor: Wu-Hsiung Liao, 1F, No. 3, Lane 71, Sec. 2, Liming Rd., Nantun District. Taichung City (TW)

( * ) Notice: Subject to any disclaimer, the term of this patent is extended or adjusted under 35 U.S.C. 154(b) by 146 days.

(21) Appl. No.: 11/746,774

(22) Filed: May 10, 2007

(51) Int. Cl.
*B62K 25/02* (2006.01)

(52) U.S. Cl. .......................... 280/288; 280/284; 474/116

(58) Field of Classification Search ................ 280/288, 280/284; 301/125, 110.5, 111.07; 474/116
See application file for complete search history.

(56) References Cited

U.S. PATENT DOCUMENTS

| | | | | |
|---|---|---|---|---|
| 589,852 A | * | 9/1897 | Owen | 280/288 |
| 641,637 A | * | 1/1900 | Caswell | 474/116 |
| 663,962 A | * | 12/1900 | Dunlop et al. | 474/116 |
| 972,510 A | * | 10/1910 | Cosset | 280/288 |
| 2,475,806 A | * | 7/1949 | Simpson | 474/116 |
| 4,967,867 A | * | 11/1990 | Fuller | 180/219 |
| 5,058,913 A | * | 10/1991 | La Riviere et al. | 280/281.1 |
| 5,082,303 A | * | 1/1992 | Duehring et al. | 280/288 |

\* cited by examiner

*Primary Examiner*—Tony H. Winner
(74) *Attorney, Agent, or Firm*—Alan Kamrath; Kamrath & Associates PA

(57) ABSTRACT

A bicycle rear frame includes a mandrel, a hub mounted on the mandrel, a freewheel secured on the hub, two rear fork end members each mounted on the mandrel and each formed with a first tapered face, two rear stays each mounted on a respective rear fork end member, two press members each mounted on the mandrel and each formed with a second tapered face rested on the first tapered face of a respective rear fork end member, and two locking nuts each screwed onto the mandrel and each rested on a respective press member. Thus, the second tapered face of each of the press members presses the first tapered face of the respective rear fork end member to prevent the freewheel and the hub from being pulled forward by the chain, thereby preventing the chain from becoming loosened.

16 Claims, 7 Drawing Sheets

BICYCLE REAR FRAME HAVING EXACTLY LOCKING EFFECT

BACKGROUND OF THE INVENTION

1. Field of the Invention

The present invention relates to a frame and, more particularly, to a bicycle rear frame.

2. Description of the Related Art

A conventional bicycle rear frame in accordance with the prior art shown in FIGS. 5-7 comprises a mandrel 21 having two opposite threaded ends 210, a hub 20 rotatably mounted on the mandrel 21, a freewheel 22 secured on one side of the hub 20 to rotate the hub 20, two rear fork end members 11 each having a rear end mounted on a respective threaded end 210 of the mandrel 21 and each rested on the hub 20, two rear stays 10 each having a rear portion mounted on a front end of a respective rear fork end member 11, two washers 23 each mounted on a respective threaded end 210 of the mandrel 21 and each rested on a respective rear fork end member 11, and two locking nuts 24 each screwed onto a respective threaded end 210 of the mandrel 21 and each rested on a respective washer 23. Each of the rear fork end members 11 has a side formed with a mounting opening 12 mounted on the respective threaded end 210 of the mandrel 21.

In assembly, a rear wheel is mounted on the hub 20, and the freewheel 22 meshes with a chain 72 which meshes with a chainwheel. Then, the mandrel 21 is mounted between the rear fork end members 11, and each of the threaded ends 210 of the mandrel 21 is inserted into the mounting opening 12 of the respective rear fork end member 11. At this time, each of the threaded ends 210 of the mandrel 21 is movable in the mounting opening 12 of the respective rear fork end member 11 to adjust the tension of the chain 72. Then, each of the washers 23 is mounted on the respective threaded end 210 of the mandrel 21 and rested on the respective rear fork end member 11. Then, each of the locking nuts 24 is screwed onto the respective threaded end 210 of the mandrel 21 and rested on the respective washer 23 to press the respective washer 23 and the respective rear fork end member 11 toward the hub 20, so that the rear fork end members 11 and the hub 20 are combined together and the hub 20 is clamped between the rear stays 10.

In operation, when the chainwheel is rotated by a crank which is rotated by pedals, the chain 72 is driven by the chainwheel to rotate the freewheel 22 which rotates the hub 20 to rotate the wheel so as to move the bicycle forward.

However, when the freewheel 22 and the hub 20 are pulled forward by the chain 72 during forward movement of the bicycle, the mandrel 21 is driven by the hub 20 to move forward to displace the freewheel 22 and the hub 20 toward the rear stays 10, so that the chain 72 easily becomes loosened from the freewheel 22. If the locking nuts 24 are tightened to press the rear fork end members 11 closely to lock the freewheel 22 and the hub 20 exactly to prevent the chain 72 from becoming loosened, each of the rear fork end members 11 made of an aluminum alloy is easily deformed or worn out due to an excessive force applied by each of the locking nuts 24 on the respective rear fork end member 11, thereby decreasing the lifetime of the rear fork end members 11.

BRIEF SUMMARY OF THE INVENTION

In accordance with the present invention, there is provided a bicycle rear frame, comprising a mandrel having two opposite threaded ends, a hub rotatably mounted on the mandrel, a freewheel secured on one side of the hub to rotate the hub, two rear fork end members each having a rear end mounted on a respective threaded end of the mandrel and each having a first side rested on the hub and a second side formed with a first tapered face, two rear stays each having a rear portion mounted on a front end of a respective rear fork end member, two press members each mounted on a respective threaded end of the mandrel and each having a first side formed with a second tapered face rested on the first tapered face of a respective rear fork end member, and two locking nuts each screwed onto a respective threaded end of the mandrel and each having a side rested on a second side of a respective press member to press the respective press member and the respective rear fork end member toward the hub.

The primary objective of the present invention is to provide a bicycle rear frame having exactly locking effect.

Another objective of the present invention is to provide a bicycle rear frame, wherein when the freewheel and the hub are pulled forward by the chain, each of the press members is driven by the mandrel to move forward relative to the respective rear fork end member, so that the second tapered face of each of the press members is movable to press the first tapered face of the respective rear fork end member to stop movement of the mandrel to prevent the freewheel and the hub from being pulled forward by the chain, thereby preventing the chain from becoming loosened.

A further objective of the present invention is to provide a bicycle rear frame, wherein when the freewheel and the hub are pulled forward by the chain, the second tapered face of each of the press members is movable to closely press the first tapered face of the respective rear fork end member by a taper engagement between the second tapered face of each of the press members and the first tapered face of the respective rear fork end member, so that the rear fork end members and the hub are combined together in a closer manner.

A further objective of the present invention is to provide a bicycle rear frame, wherein each of the locking nuts needs not to be tightened closely to prevent the respective rear fork end member from being deformed or worn out due to an excessive force applied by each of the locking nuts on the respective rear fork end member, thereby enhancing the lifetime of the rear fork end members.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
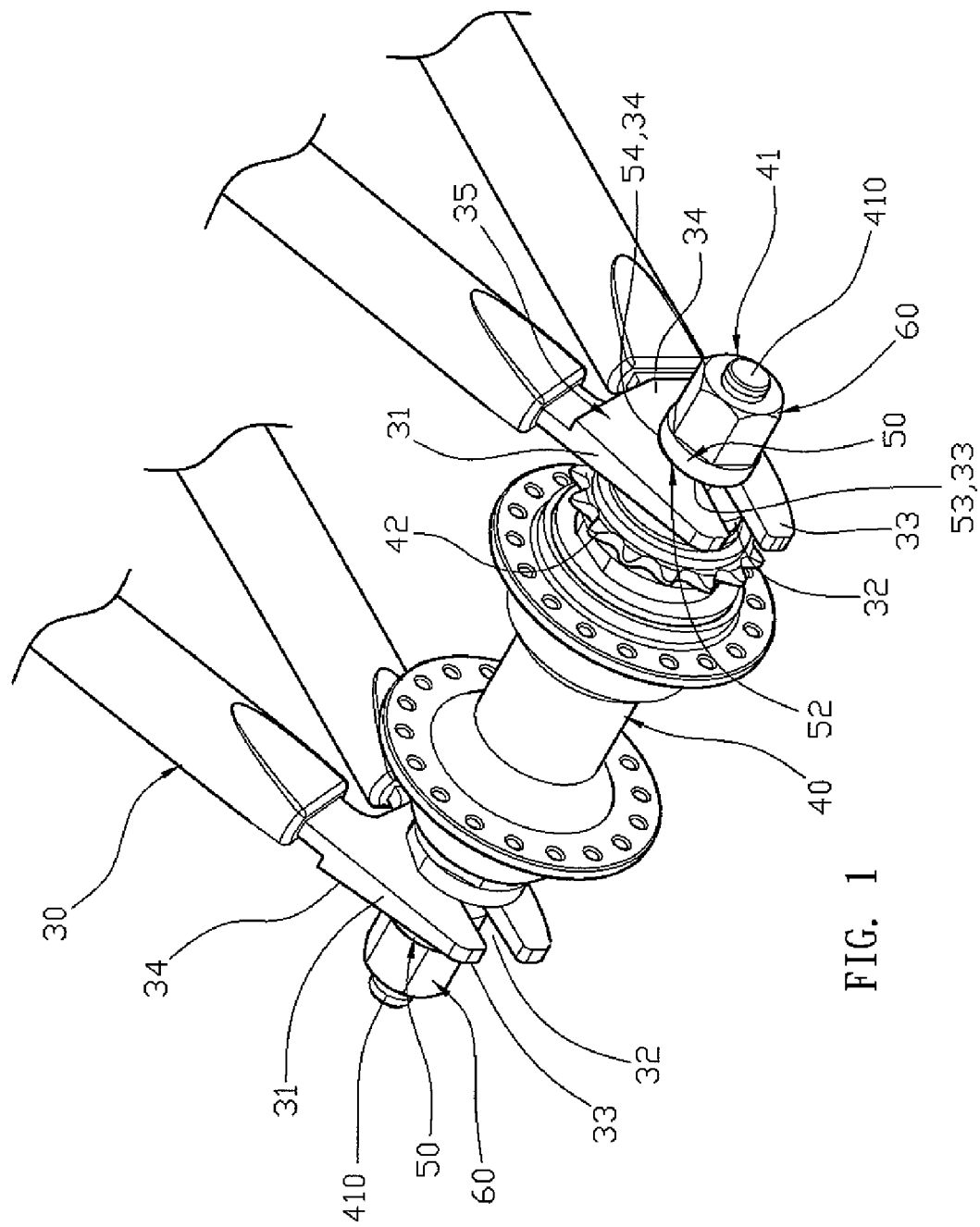
FIG. 1 is a perspective view of a bicycle rear frame in accordance with the preferred embodiment of the present invention.
Figure 2:
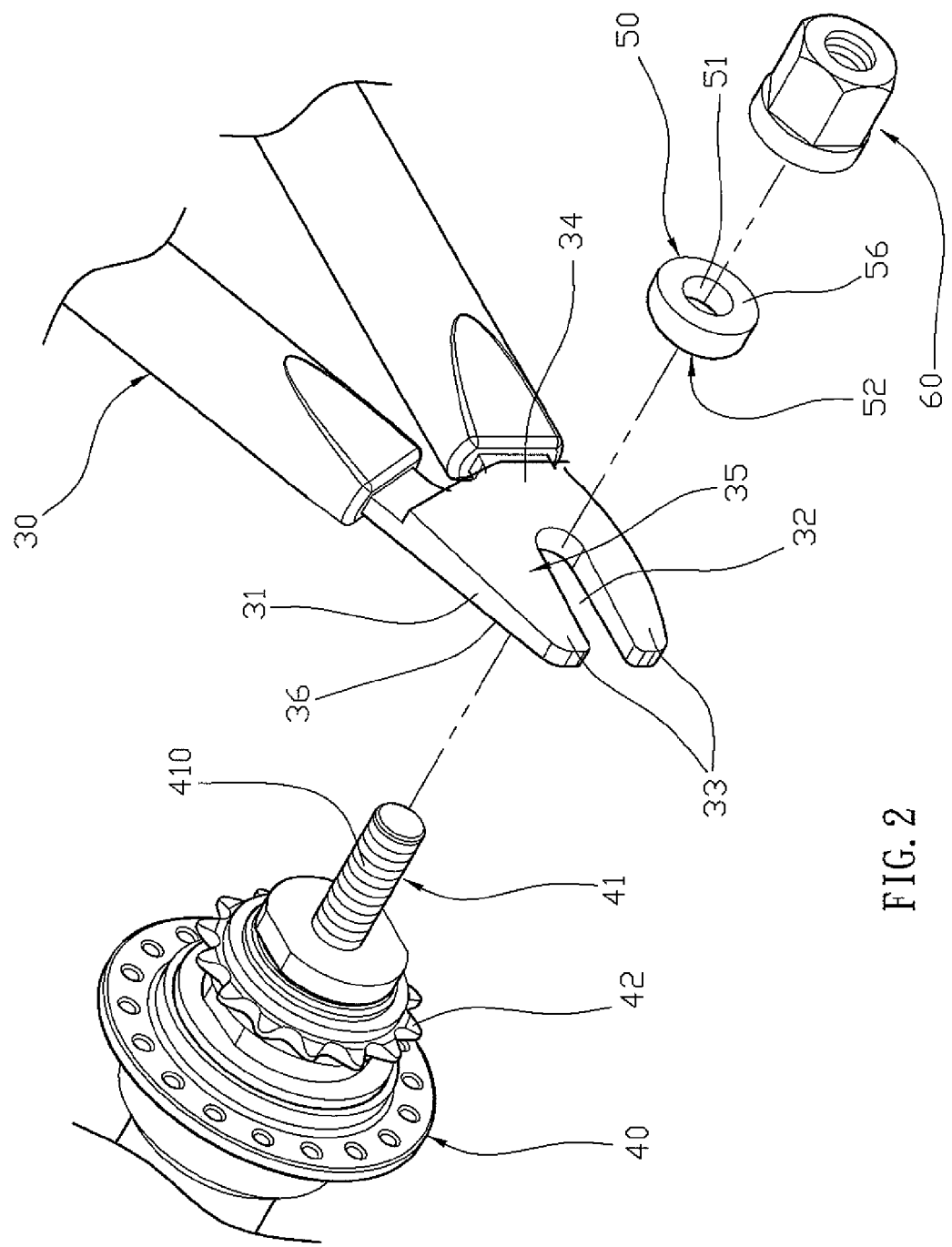
FIG. 2 is a partially exploded perspective view of the bicycle rear frame as shown in FIG. 1.
Figure 3:
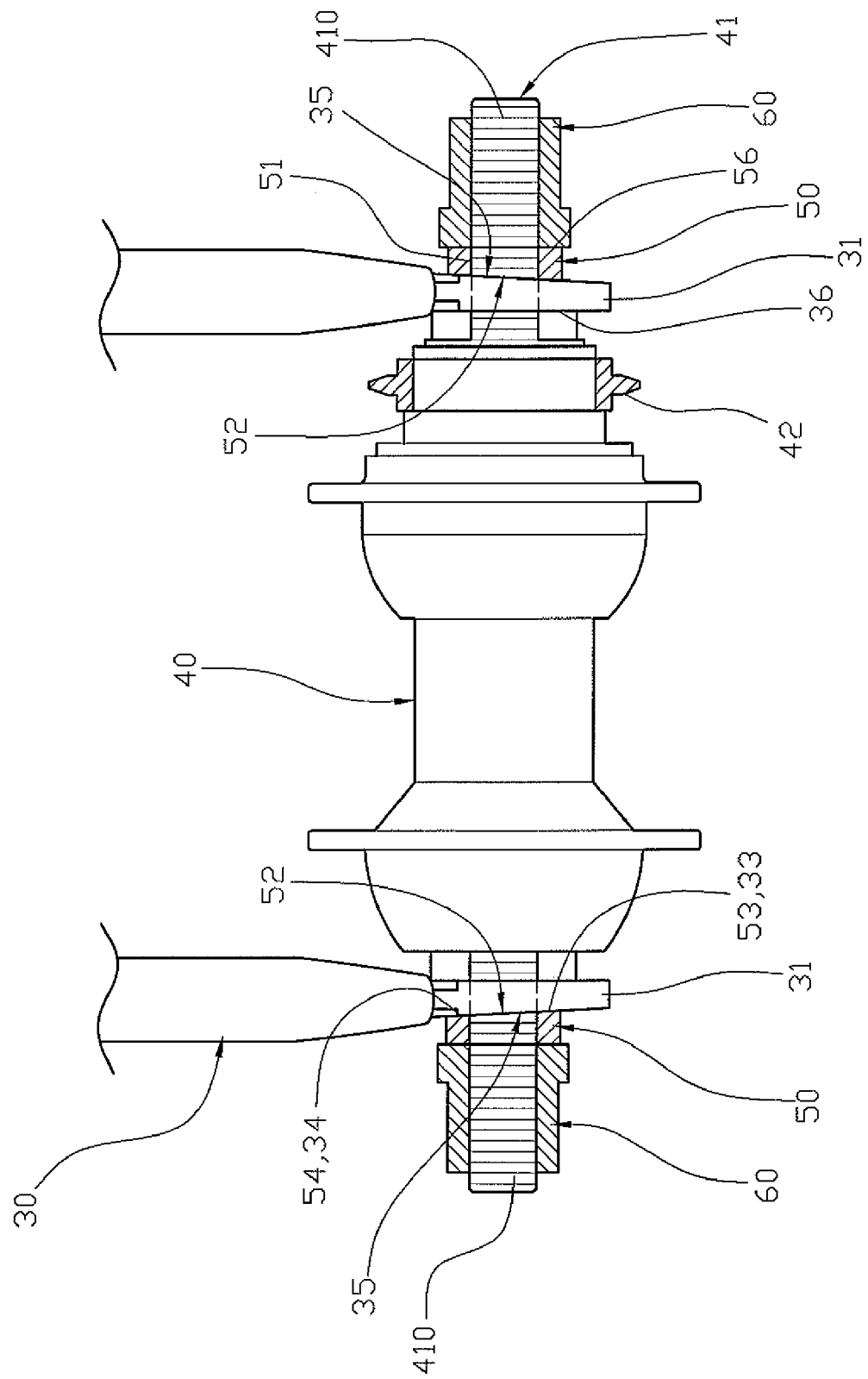
FIG. 3 is a top cross-sectional view of the bicycle rear frame as shown in FIG. 1.
Figure 4:
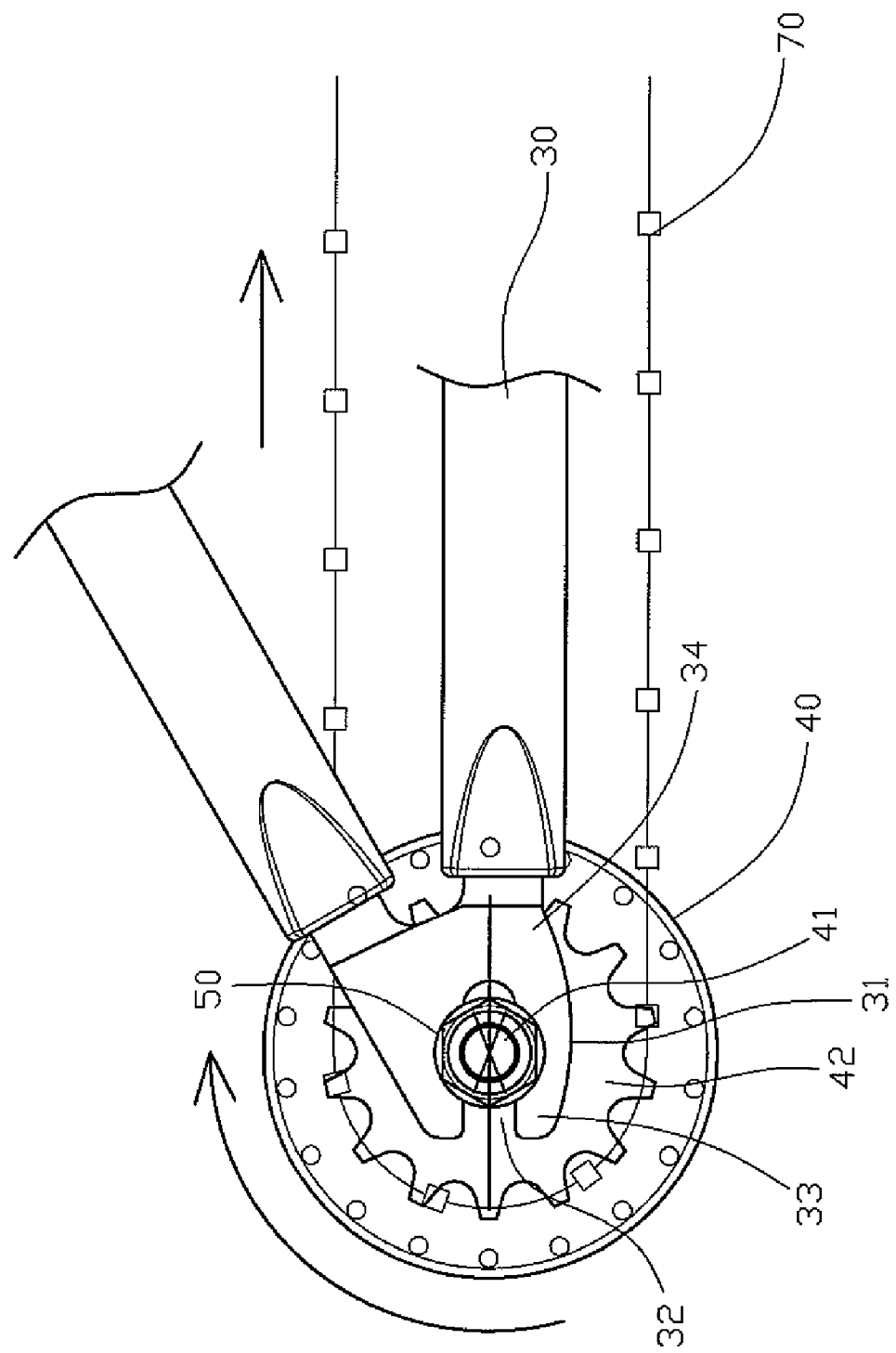
FIG. 4 is a front view of the bicycle rear frame as shown in FIG. 1.
Figure 5:
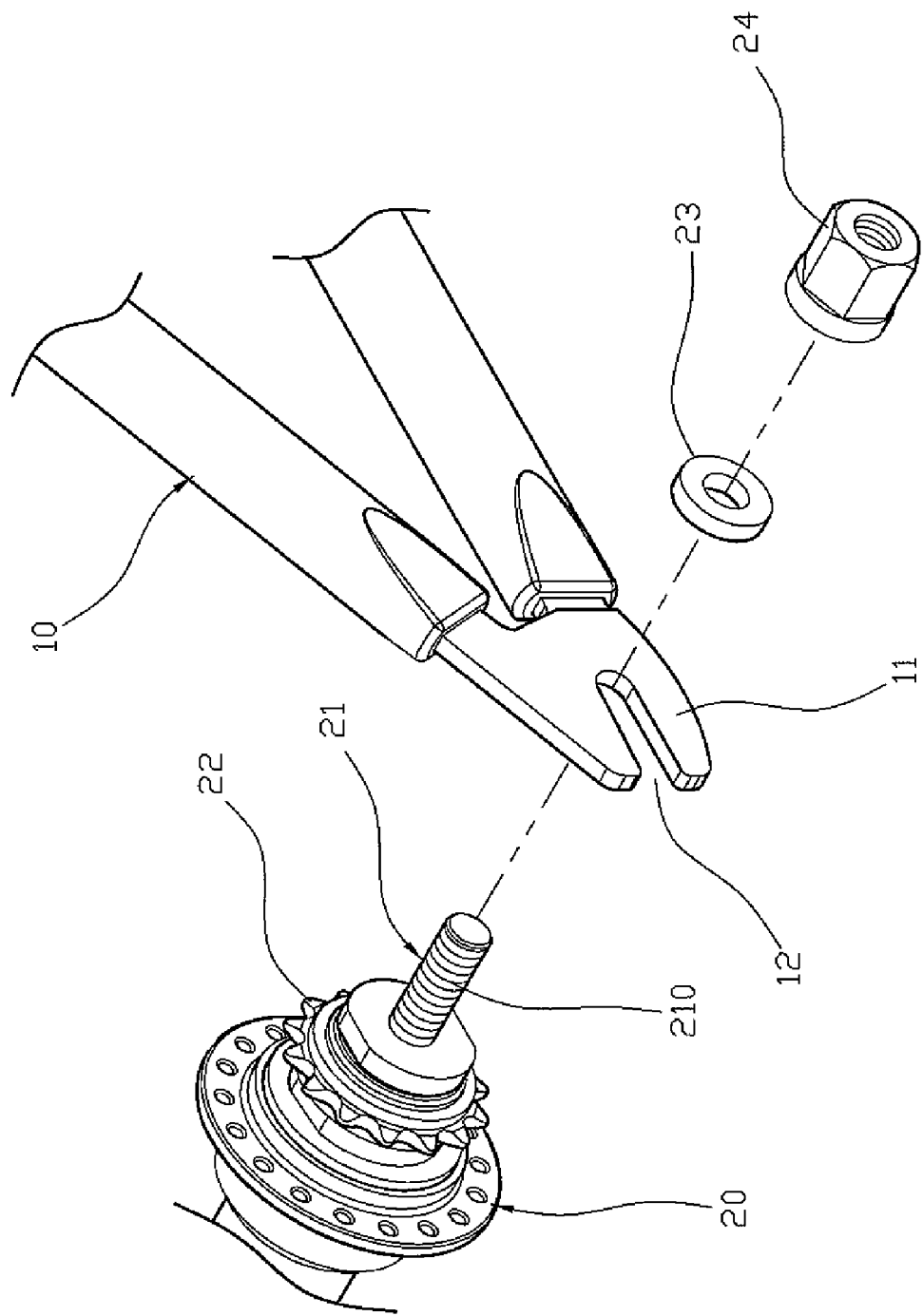
FIG. 5 is an exploded perspective view of a conventional bicycle rear frame in accordance with the prior art.
Figure 6:
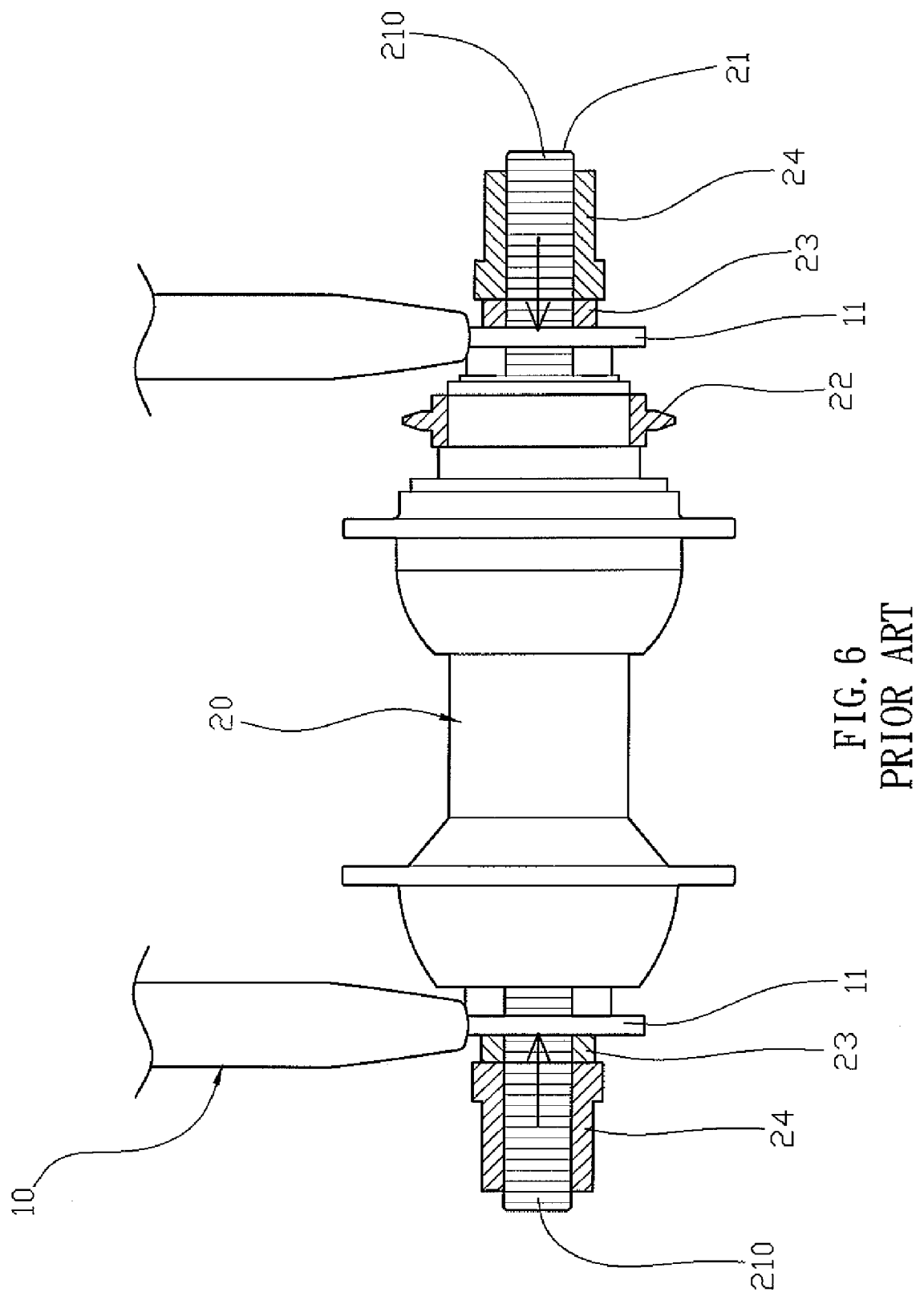
FIG. 6 is a top cross-sectional view of the conventional bicycle rear frame as shown in FIG. 5.
Figure 7:
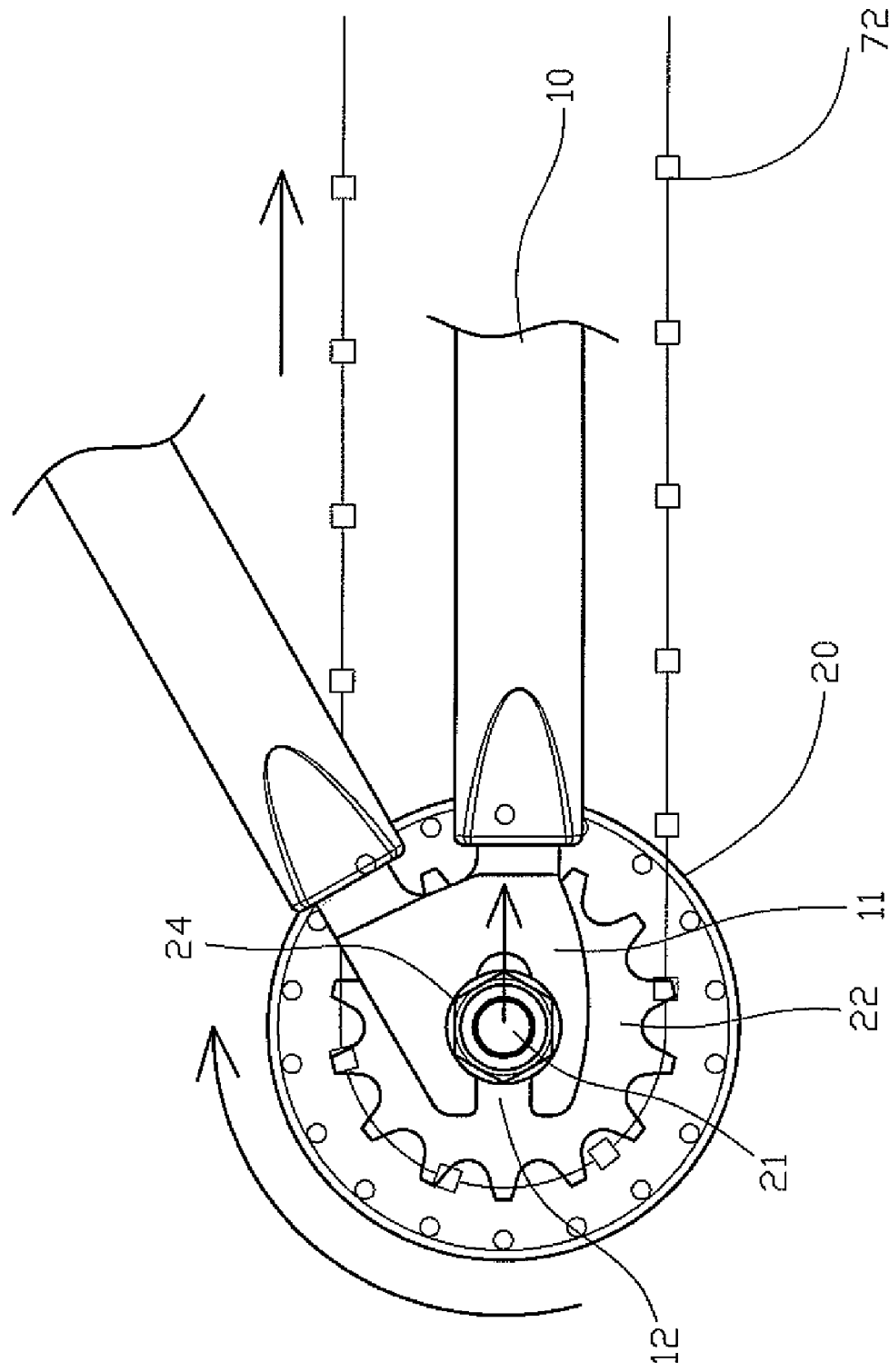
FIG. 7 is a front view of the conventional bicycle rear frame as shown in FIG. 5.

Referring to the drawings and initially to FIGS. 1-3, a bicycle rear frame in accordance with the preferred embodiment of the present invention comprises a mandrel 41 having two opposite threaded ends 410, a hub 40 rotatably mounted on the mandrel 41, a freewheel 42 secured on one side of the hub 40 to rotate the hub 40, two rear fork end members 31 each having a rear end mounted on a respective threaded end 410 of the mandrel 41 and each having a first side 36 rested on the hub 40 and a second side formed with a first tapered face 35, two rear stays 30 each having a rear portion mounted on a front end of a respective rear fork end member 31, two press members 50 each mounted on a respective threaded end 410 of the mandrel 41 and each having a first side formed with a second tapered face 52 rested on the first tapered face 35 of a respective rear fork end member 31, and two locking nuts 60 each screwed onto a respective threaded end 410 of the mandrel 41 and each having a side rested on a second side 56 of a respective press member 50 to press the respective press member 50 and the respective rear fork end member 31 toward the hub 40.

The hub 40 is located between the rear fork end members 31 and between the rear stays 30.

The first tapered face 35 of each of the rear fork end members 31 and the second tapered face 52 of each of the press members 50 are directed toward two opposite inclined directions and have the same inclination so that the first tapered face 35 of each of the rear fork end members 31 and the second tapered face 52 of each of the press members 50 are complementary with each other. The first tapered face 35 of each of the rear fork end members 31 has a front end 34 and a rear end 33, wherein the front end 34 of the first tapered face 35 is located between the rear end 33 of the first tapered face 35 and the respective rear stay 30. Each of the rear fork end members 31 has a thickness gradually increased from the rear end 33 to the front end 34 of the first tapered face 35. Thus, the first tapered face 35 of each of the rear fork end members 31 is inclined reward relative to the hub 40 and inclined reward relative to the second tapered face 52 of the respective press member 50. The first side 36 of each of the rear fork end members 31 is a flat face. Each of the rear fork end members 31 has a side formed with a rearward extending elongate mounting opening 32 movably mounted on the respective threaded end 410 of the mandrel 41. The mounting opening 32 of each of the rear fork end members 31 is located at the rear end 33 of the first tapered face 35.

Each of the press members 50 is a washer and has a central portion formed with a passage 51 to allow passage of the respective threaded end 410 of the mandrel 41. The second tapered face 52 of each of the press members 50 has a front end 54 and a rear end 53, wherein the front end 54 of the second tapered face 52 is located between the rear end 53 of the second tapered face 52 and the respective rear stay 30. Each of the press members 50 has a thickness gradually decreased from the rear end 53 to the front end 54 of the second tapered face 52. Thus, the second tapered face 52 of each of the press members 50 is inclined forward relative to the hub 40 and inclined forward relative to the first tapered face 35 of the respective rear fork end member 31. The second side 56 of each of the press members 50 is a flat face.

In assembly, referring to FIGS. 1-4, a rear wheel is mounted on the hub 40, and the freewheel 42 meshes with a chain 70 which meshes with a chainwheel. Then, the mandrel 41 is mounted between the rear fork end members 31, and each of the threaded ends 410 of the mandrel 41 is inserted into the mounting opening 32 of the respective rear fork end member 31. At this time, each of the threaded ends 410 of the mandrel 41 is movable in the mounting opening 32 of the respective rear fork end member 31 to adjust the tension of the chain 70 according to the length of the chain 70. Then, each of the press members 50 is mounted on the respective threaded end 410 of the mandrel 41, and the second tapered face 52 of each of the press members 50 is rested on the first tapered face 35 of the respective rear fork end member 31. Then, each of the locking nuts 60 is screwed onto the respective threaded end 410 of the mandrel 41 and rested on the second side 56 of the respective press member 50 to press the respective press member 50 and the respective rear fork end member 31 toward the hub 40, so that the rear fork end members 31 and the hub 40 are combined together and the hub 40 is clamped between the rear stays 30.

In operation, when the chainwheel is rotated by a crank which is rotated by pedals, the chain 70 is driven by the chainwheel to rotate the freewheel 42 which rotates the hub 40 to rotate the wheel so as to move the bicycle forward.

In such a manner, when the freewheel 42 and the hub 40 are pulled forward by the chain 70 during forward movement of the bicycle, the mandrel 41 is driven by the hub 40 to move forward toward the rear stays 30, and each of the press members 50 is driven by the mandrel 41 to move forward relative to the respective rear fork end member 31, so that the second tapered face 52 of each of the press members 50 is movable to press the first tapered face 35 of the respective rear fork end member 31 by a taper engagement between the second tapered face 52 of each of the press members 50 and the first tapered face 35 of the respective rear fork end member 31 to stop movement of the mandrel 41 to prevent the freewheel 42 and the hub 40 from being pulled by the chain 70 to move forward, thereby preventing the chain 70 from becoming loosened. In addition, when the freewheel 42 and the hub 40 are pulled forward by the chain 70, the second tapered face 52 of each of the press members 50 is movable to closely press the first tapered face 35 of the respective rear fork end member 31 by a taper engagement between the second tapered face 52 of each of the press members 50 and the first tapered face 35 of the respective rear fork end member 31, so that the rear fork end members 31 and the hub 40 are combined together in a closer manner.

Accordingly, when the freewheel 42 and the hub 40 are pulled forward by the chain 70, each of the press members 50 is driven by the mandrel 41 to move forward relative to the respective rear fork end member 31, so that the second tapered face 52 of each of the press members 50 is movable to press the first tapered face 35 of the respective rear fork end member 31 to stop movement of the mandrel 41 to prevent the freewheel 42 and the hub 40 from being pulled forward by the chain 70, thereby preventing the chain 70 from becoming loosened. In addition, when the freewheel 42 and the hub 40 are pulled forward by the chain 70, the second tapered face 52 of each of the press members 50 is movable to closely press the first tapered face 35 of the respective rear fork end member 31 by a taper engagement between the second tapered face 52 of each of the press members 50 and the first tapered face 35 of the respective rear fork end member 31, so that the rear fork end members 31 and the hub 40 are combined together in a closer manner. Further, each of the locking nuts 60 needs not to be tightened closely to prevent the respective rear fork end member 31 from being deformed or worn out due to an excessive force applied by each of the locking nuts 60 on the respective rear fork end member 31, thereby enhancing the lifetime of the rear fork end members 31.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle rear frame, comprising:
   a mandrel having two opposite threaded ends;
   a hub rotatably mounted on the mandrel;
   a freewheel secured on one side of the hub to rotate the hub;
   two rear fork end members each having a rear end mounted on a respective threaded end of the mandrel and each having a first side rested on the hub and a second side formed with a first tapered face;
   two rear stays each having a rear portion mounted on a front end of a respective rear fork end member;
   two press members each mounted on a respective threaded end of the mandrel and each having a first side formed with a second tapered face rested on the first tapered face of a respective rear fork end member;
   two locking nuts each screwed onto a respective threaded end of the mandrel and each having a side rested on a second side of a respective press member to press the respective press member and the respective rear fork end member toward the hub.

2. The bicycle rear frame in accordance with claim 1, wherein:
   the first tapered face of each of the rear fork end members has a front end and a rear end;
   the front end of the first tapered face is located between the rear end of the first tapered face and the respective rear stay;
   each of the rear fork end members has a thickness gradually increased from the rear end to the front end of the first tapered face.

3. The bicycle rear frame in accordance with claim 2, wherein:
   the second tapered face of each of the press members has a front end and a rear end;
   the front end of the second tapered face is located between the rear end of the second tapered face and the respective rear stay;
   each of the press members has a thickness gradually decreased from the rear end to the front end of the second tapered face.

4. The bicycle rear frame in accordance with claim 3, wherein the first tapered face of each of the rear fork end members and the second tapered face of each of the press members are directed toward two opposite inclined directions.

5. The bicycle rear frame in accordance with claim 3, wherein the first tapered face of each of the rear fork end members and the second tapered face of each of the press members have the same inclination.

6. The bicycle rear frame in accordance with claim 3, wherein the first tapered face of each of the rear fork end members and the second tapered face of each of the press members are complementary with each other.

7. The bicycle rear frame in accordance with claim 1, wherein the first tapered face of each of the rear fork end members is inclined reward relative to the hub and inclined reward relative to the second tapered face of the respective press member.

8. The bicycle rear frame in accordance with claim 1, wherein the first side of each of the rear fork end members is a flat face.

9. The bicycle rear frame in accordance with claim 2, wherein each of the rear fork end members has a side formed with a rearward extending elongate mounting opening movably mounted on the respective threaded end of the mandrel.

10. The bicycle rear frame in accordance with claim 9, wherein the mounting opening of each of the rear fork end members is located at the rear end of the first tapered face.

11. The bicycle rear frame in accordance with claim 1, wherein each of the press members is a washer.

12. The bicycle rear frame in accordance with claim 1, wherein each of the press members has a central portion formed with a passage to allow passage of the respective threaded end of the mandrel.

13. The bicycle rear frame in accordance with claim 1, wherein the second tapered face of each of the press members is inclined forward relative to the hub and inclined forward relative to the first tapered face of the respective rear fork end member.

14. The bicycle rear frame in accordance with claim 1, wherein the second side of each of the press members is a flat face.

15. The bicycle rear frame in accordance with claim 1, wherein the hub is located between the rear fork end members and between the rear stays.

16. The bicycle rear frame in accordance with claim 1, wherein when the freewheel and the hub are pulled forward, the mandrel is driven by the hub to move forward toward the rear stays, and each of the press members is driven by the mandrel to move forward relative to the respective rear fork end member, so that the second tapered face of each of the press members is movable to press the first tapered face of the respective rear fork end member by a taper engagement between the second tapered face of each of the press members and the first tapered face of the respective rear fork end member to stop movement of the mandrel to prevent the freewheel and the hub from being pulled forward.

* * * * *